(12) United States Patent
Grandchamp

(10) Patent No.: US 12,188,749 B2
(45) Date of Patent: Jan. 7, 2025

(54) MULTIFUNCTIONAL, VERSATILE CAMOUFLAGE DEVICE

(71) Applicant: Grandventions LLC, Hopewell Junction, NY (US)

(72) Inventor: Robert A. Grandchamp, Hopewell Juncton, NY (US)

(*) Notice: Subject to any disclaimer, the term of this patent is extended or adjusted under 35 U.S.C. 154(b) by 0 days.

(21) Appl. No.: 18/169,590

(22) Filed: Feb. 15, 2023

(65) Prior Publication Data
US 2023/0258432 A1     Aug. 17, 2023

Related U.S. Application Data

(60) Provisional application No. 63/310,621, filed on Feb. 16, 2022.

(51) Int. Cl.
| | | |
|---|---|---|
| *F41H 3/00* | (2006.01) | |
| *A01M 31/00* | (2006.01) | |
| *F16B 7/18* | (2006.01) | |
| *F16M 11/04* | (2006.01) | |

(52) U.S. Cl.
CPC .............. *F41H 3/00* (2013.01); *A01M 31/00* (2013.01); *F16B 7/185* (2013.01); *F16M 11/04* (2013.01)

(58) Field of Classification Search
CPC .. F41H 3/00; A01M 31/00; F16B 7/18; F16M 11/04; A47G 7/00; B63G 8/34; B63G 13/02
USPC ........................................................ 248/27.8
See application file for complete search history.

(56) References Cited

U.S. PATENT DOCUMENTS

| | | | | |
|---|---|---|---|---|
| 1,540,637 | A * | 6/1925 | Kratzel | A47G 33/04 248/217.4 |
| 3,033,504 | A * | 5/1962 | Cronin | A47G 33/04 248/314 |
| 3,632,147 | A * | 1/1972 | Finger | A47F 5/14 403/171 |
| 3,682,753 | A * | 8/1972 | Willinger | A41G 1/00 428/23 |
| 3,746,600 | A * | 7/1973 | Circelli | A47G 33/06 248/27.8 |
| 4,813,441 | A * | 3/1989 | Kepley | A01M 31/025 135/901 |
| 4,937,109 | A * | 6/1990 | Lin | A01G 5/04 434/93 |
| 5,249,591 | A * | 10/1993 | Gamadi | F16M 11/2021 135/120.3 |
| 5,628,487 | A | 5/1997 | Huber | |
| 6,306,471 | B1 * | 10/2001 | Pitman | A01M 31/00 135/901 |

(Continued)

OTHER PUBLICATIONS

Written Opinion of the International Searching Authority for International Application No. PCT/US23/62692 dated Jun. 7, 2023, six (6) pages.

*Primary Examiner* — Nkeisha Smith
(74) *Attorney, Agent, or Firm* — LAW OFFICES OF MICHAEL L. WISE, LLC

(57) ABSTRACT

A multifunctional, versatile, camouflage device including a puck including a top, a bottom, and a plurality of sides, a securing device on the bottom configured to secure the puck to an object, one or more of the plurality of sides including a threaded opening configured to secure a device to the puck, and wherein a plurality of devices coupled to the puck create a camouflage area proximate a user.

33 Claims, 17 Drawing Sheets

(56) References Cited

U.S. PATENT DOCUMENTS

| | | | |
|---|---|---|---|
| 6,543,175 B1* | 4/2003 | Tucker | F41H 3/00 |
| | | | 47/41.12 |
| 6,715,622 B2* | 4/2004 | Keenan | A47F 7/0071 |
| | | | 211/205 |
| 7,051,839 B1 | 5/2006 | George | |
| 8,356,784 B2* | 1/2013 | Doll | F16M 13/022 |
| | | | 248/316.1 |
| 9,185,902 B1 | 11/2015 | Mazzei, Sr. | |
| 11,758,901 B2* | 9/2023 | Adams | F16M 13/02 |
| | | | 248/27.8 |
| 2007/0212190 A1* | 9/2007 | Monday | F16B 23/0015 |
| | | | 411/85 |
| 2009/0178326 A1* | 7/2009 | Suter | A01M 31/025 |
| | | | 428/18 |
| 2010/0269876 A1 | 10/2010 | Schlipf | |
| 2017/0027161 A1* | 2/2017 | Jones | A01M 31/002 |
| 2022/0174939 A1 | 6/2022 | Adams | |

* cited by examiner

Section A-A

Section B-B

MULTIFUNCTIONAL, VERSATILE CAMOUFLAGE DEVICE

RELATED APPLICATIONS

This application claims benefit of and priority to U.S. Provisional Application Ser. No. 63/310,621 filed Feb. 16, 2022, under 35 U.S.C. §§ 119, 120, 363, 365, and 37 C.F.R. § 1.55 and § 1.78, which is incorporated herein by this reference.

FIELD OF THE INVENTION

This invention relates to a multifunctional, versatile, camouflage device.

BACKGROUND OF THE INVENTION

As is well known, camouflage devices may be used by hunters, the military, the police, and the like. Conventional camouflage devices are typically designed to be used on the ground or in a tree. Conventional camouflage devices are typically complicated and time consuming to assemble, difficult to relocate, and are limited to being setup on the ground or in a tree. Conventional camouflage devices may also be limited to attaching either artificial or real camouflage branches.

Thus, there is a need for a multifunctional, versatile, camouflage device that is simple and easy to set up and dismantle, easy to relocate from one position to another, is not limited to being setup on the ground or in a tree, can attach either artificial camouflage branches, real camouflage branch, or a combination of both, and which may also attach other useful devices.

SUMMARY OF THE INVENTION

Featured is a multifunctional, versatile, camouflage device is featured. The camouflage device includes a puck including a top, a bottom, and a plurality of sides. A securing device on the bottom is configured to secure the puck to an object, one or more of the plurality of sides includes a threaded opening configured to secure a device to the puck. A plurality of devices coupled to the puck create a camouflage area proximate a user.

In one embodiment one or more of the plurality of devices may include an artificial branch or a real camouflage branch. The securing device may include a bracket configured to receive a strap for securing the puck to the object. The threaded opening may be female threaded. The device may be threaded to the female threaded opening to secure the device to the puck. The device may include at least one quick-lock device coupled to female threaded opening configured to secure the device to the puck. The quick-lock device may include a connector including a threaded portion on one end configured to thread into the female threaded openings and a male thread portion on the other end configured to secure one of the plurality of devices. The camouflage device may include a real branch attachment device including a threaded portion on one end configured to thread into the female threaded opening and a cone shaped housing on the other end configured to secure a real camouflage branch. The cone shaped housing may include sharp protruding threads on an inside surface of the cone configured to secure the real camouflage branch to the cone shaped housing. The plurality of sides of the puck may be sloped. The puck may be octagonal shaped. The puck may include a shaped cutout. The camouflage device may include a plug shaped to fit into the shaped cutout. The plug may include at least one threaded opening on a bottom of the plug and a least one threaded opening on a top of the plug. One of the plurality of devices may be coupled to the threaded opening on the top surface of the plug. The puck may include an opening in a center of the puck. The puck and the plug may be attached to the object with a threaded stud coupled to the object and extending though the opening in the puck and into the threaded opening on the bottom of the plug. The cutout in the puck may include at least one slot and the plug includes at least one fin. The at least one fin may be configured to mate with the at least one slot. The camouflage area may create a camouflage backdrop located behind the user which breaks-up the silhouette of the hunter.

In another aspect, a multifunctional, versatile, camouflage device, the camouflage device includes a puck including a top, a bottom, and a plurality of sides, a securing device on the bottom configured to secure the puck to an object, one or more of the plurality of sides including a threaded opening configured to secure a device to the puck, and a shaped cutout in the top of the puck. A plug shaped to fit into the cutout. The plug includes one or more openings therein configured to secure a device to the plug, a plurality of devices coupled to the puck create a camouflage area proximate a user.

In one embodiment, one or more of the plurality of devices includes an artificial branch or a real camouflage branch. The securing device may include a bracket configured to receive a strap for securing the puck to the object. The threaded opening may be female threaded. The device may be threaded to the female threaded opening to secure the device to the puck. The device may include at least one quick-lock device coupled to the female threaded opening configured to secure the device to the puck. The quick-lock device may include a connector including a threaded portion on one end configured to thread into the female threaded opening and a male thread portion on the other end configured to secure one of the plurality of devices. The camouflage device may include a real branch attachment device including a threaded portion on one end configured to thread into the female threaded opening and a cone shaped housing on the other end configured to secure a real camouflage branch. The cone shaped housing may include sharp protruding threads on an inside surface of the cone configured to secure the real camouflage branch to the cone shaped housing. The plurality of sides of the puck may be sloped. The puck may be octagonal shaped. The puck may include a shaped cutout. The plug may be shaped to fit into the shaped cutout. The plug may include at least one threaded opening on a bottom of the plug and a least one threaded opening on a top of the plug. One of the plurality of devices may be coupled to the threaded opening on the top surface of the plug. The puck may include an opening in a center of the puck. The puck and the plug may be attached to the object with a threaded stud coupled to the object and extending though the opening in the puck and into the threaded opening on the bottom of the plug. The cutout in the puck may include at least one slot and the plug includes at least one fin. The at least one fin may be configured to mate with the at least one slot. The camouflage area may create a camouflage backdrop located behind the user which breaks-up the silhouette of the hunter.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1A:
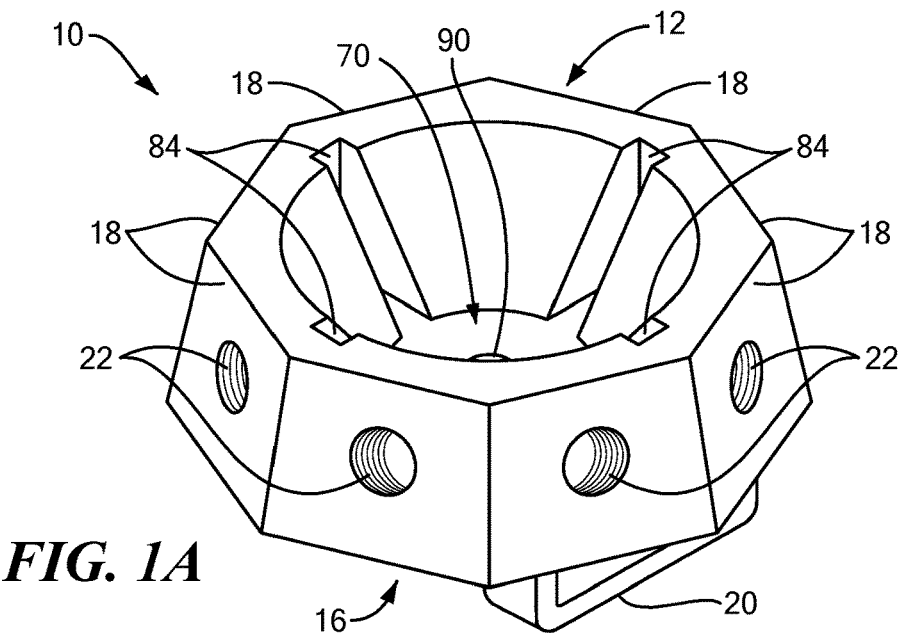
FIG. 1A is a three-dimensional view showing one example of the multifunctional, versatile, camouflage device.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

There is shown in FIGS. 1A-1E one example of multi-functional, versatile, camouflage device 10. Camouflage device 10 includes puck 12 including top 14, bottom 16 and a plurality of sides, exemplarily indicated at 18. Puck 12 includes securing device 20 on bottom 16 as shown in FIGS. 1A, 1B, 1C, and 1D. In this example, securing device 18 is preferably configured as a bracket as shown which receives a strap, e.g., a ratchet or tie down strap, or similar type strap, which is preferably fed through bracket 20 on bottom of puck 12, then wrapped around an object, such as a tree, a pole, a fence, a vehicle, or any object capable of having a strap secured thereto, to quickly and easily secure camouflage device 10 to the object. In some examples, securing device 20 may have other designs as known by those skilled in the art. In some designs, puck 12 may not necessarily include securing device 20.

The plurality of sides 18, FIGS. 1A-1E, are preferably sloped as shown. In one example, puck 12 preferably has 8 sides and is preferably orthogonal shaped as shown. In other examples, puck 12 may include more or less than 8 sides and may have any shape, including a circular shape, as known by those skilled in the art.

Figure 2A:
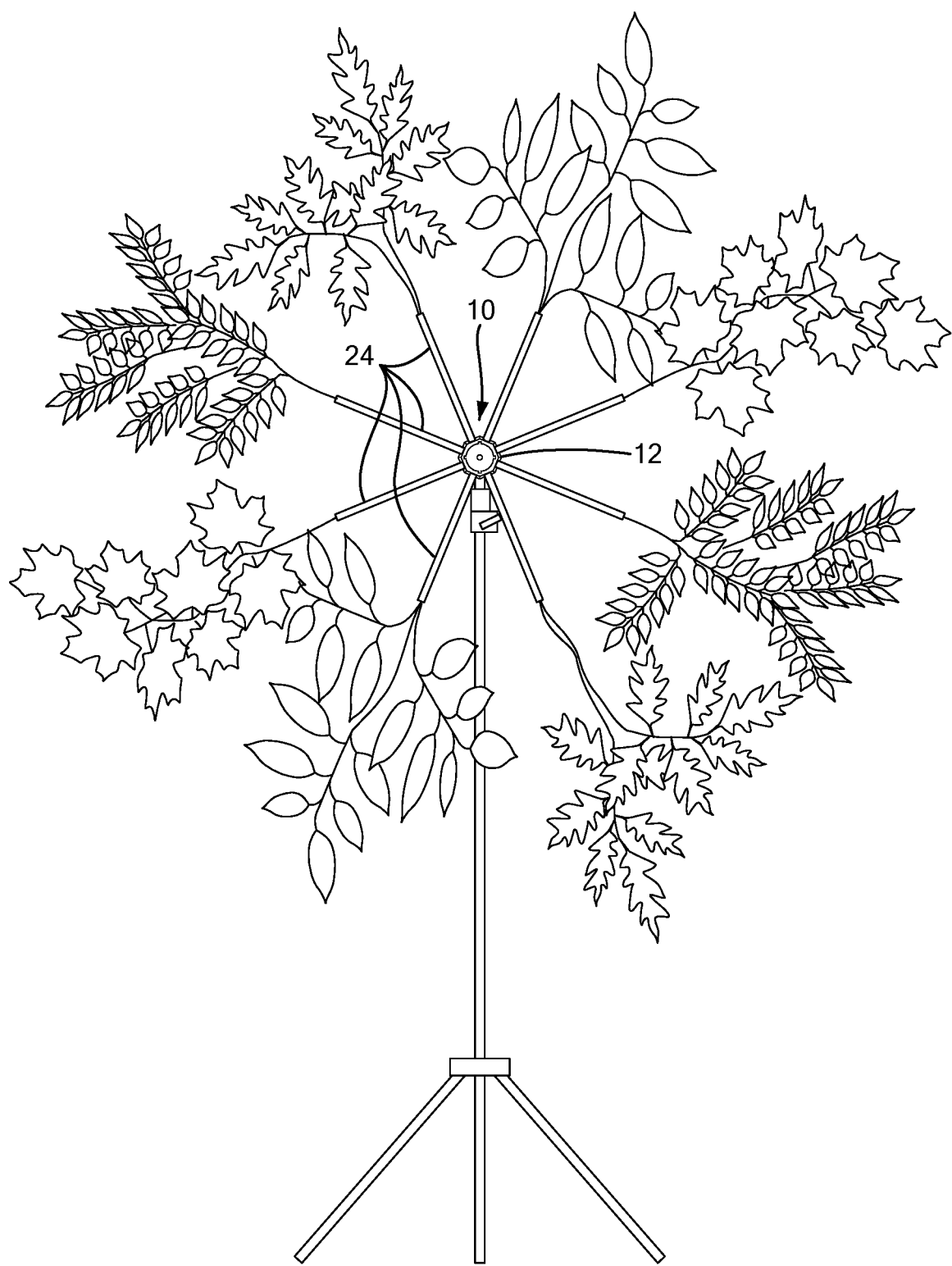
FIG. 2A shows an example of camouflage branches coupled to the camouflage device shown in FIGS. 1A-1E.

One or more, or all of, sides 18 include a threaded opening, exemplarily indicated at 22, which each may secure a threaded device to puck 12. In one example, the device may include one or more artificial branches 24, FIG. 2A, real branches, as discussed below, or a combination of artificial branches 24 and real branches, which may be utilized to create a camouflage area proximate a user of camouflage device 10.

Figure 2B:
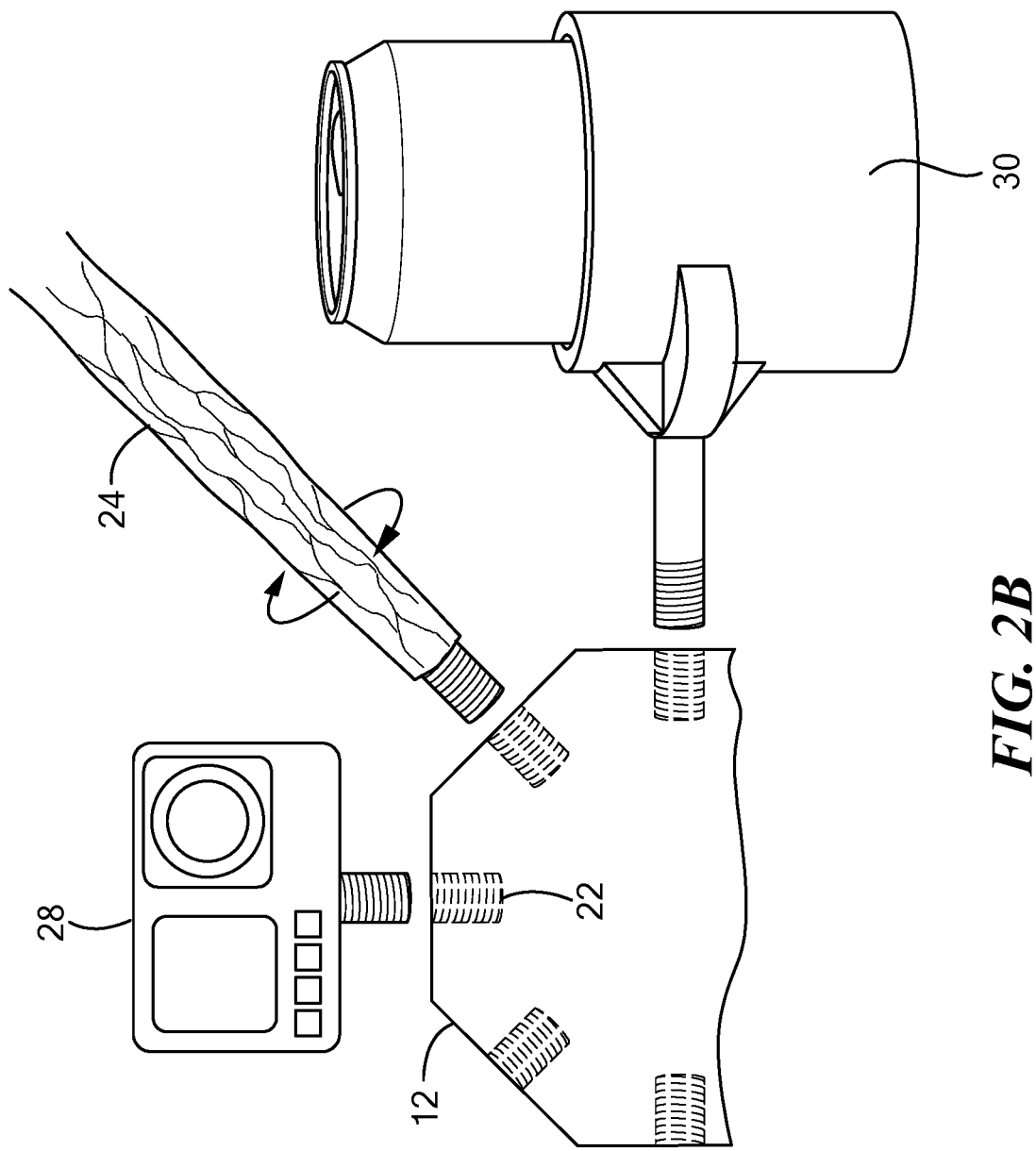
FIGS. 2B and 2C show examples of a few useful devices which may be attached to the camouflage device shown in FIGS. 1A-1E.
Figure 2C:
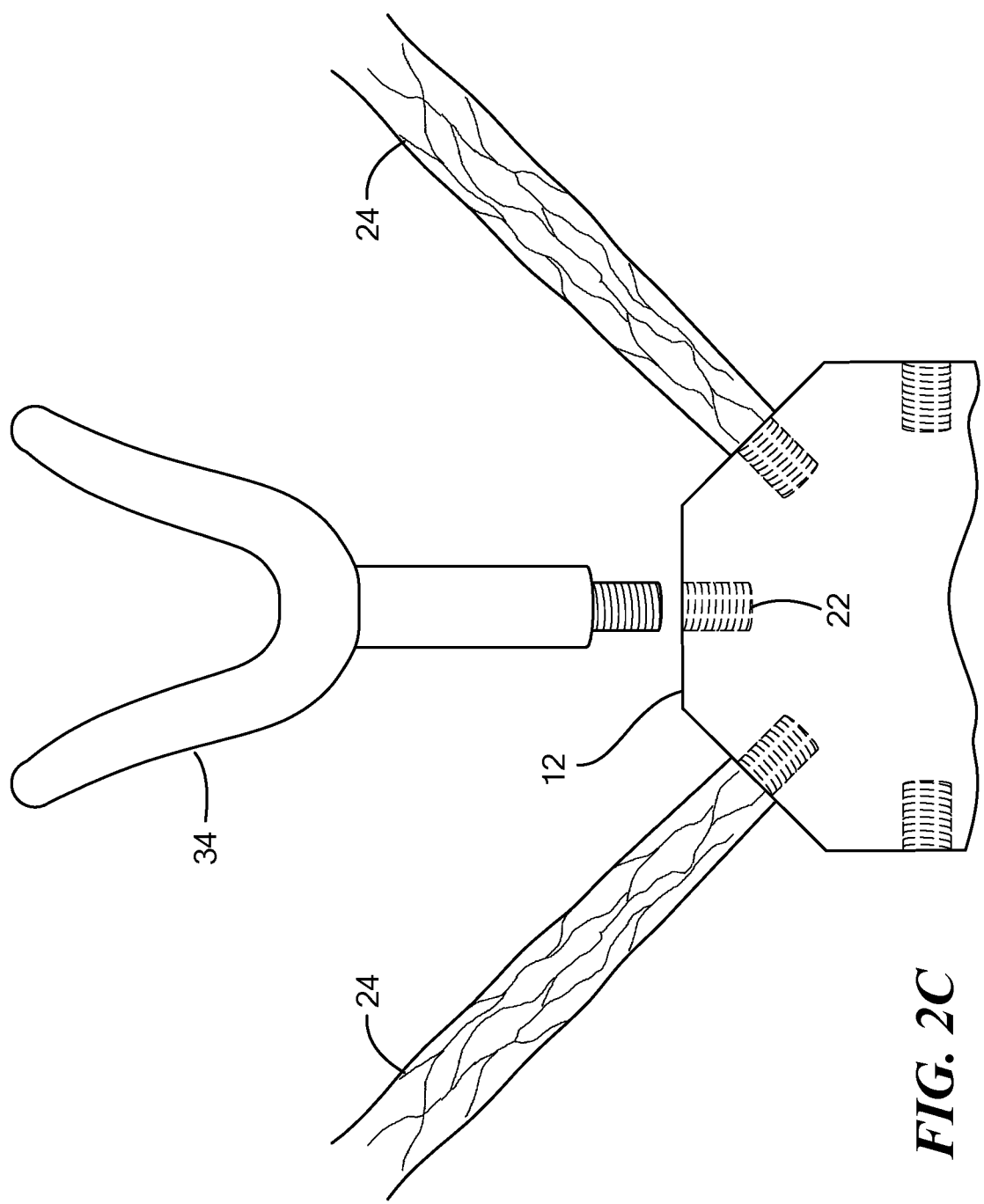

One or more of openings 22 may also be used to secure any type of useful device to puck 12 that has a threaded stud or thread portion thereon. For illustrative purposes only, FIG. 2B shows a few examples of possible useful devices that can be secured to puck 12, e.g., camera device 28, beverage holder 30, artificial branch 24, and gun rest 34, FIG. 2C. The number of useful devices that can be secured to puck 12 is not limited to these examples. Any device that is useful to a user of camouflage device 10 that includes a threaded stud or thread portion thereon that can be threaded into opening 22 can be used.

Figure 1B:
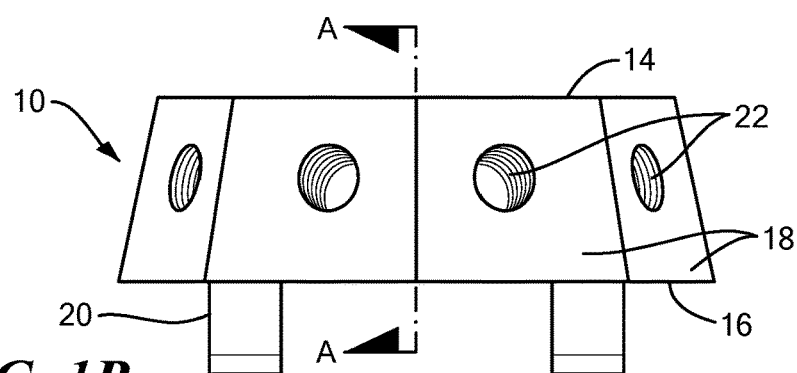
FIG. 1B is a schematic side view of the camouflage device shown in FIG. 1A.
Figure 1C:
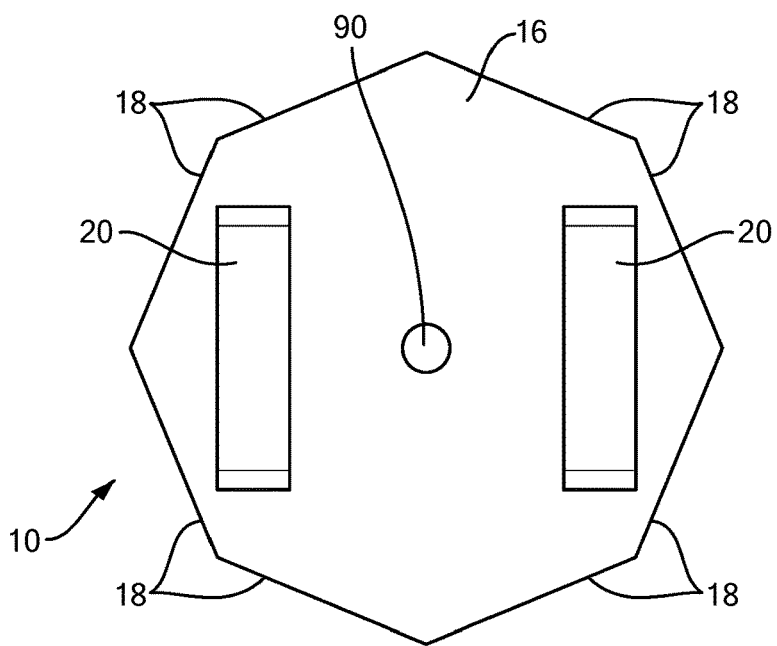
FIG. 1C is a schematic bottom view of the camouflage device shown in FIG. 1A.
Figure 1D:
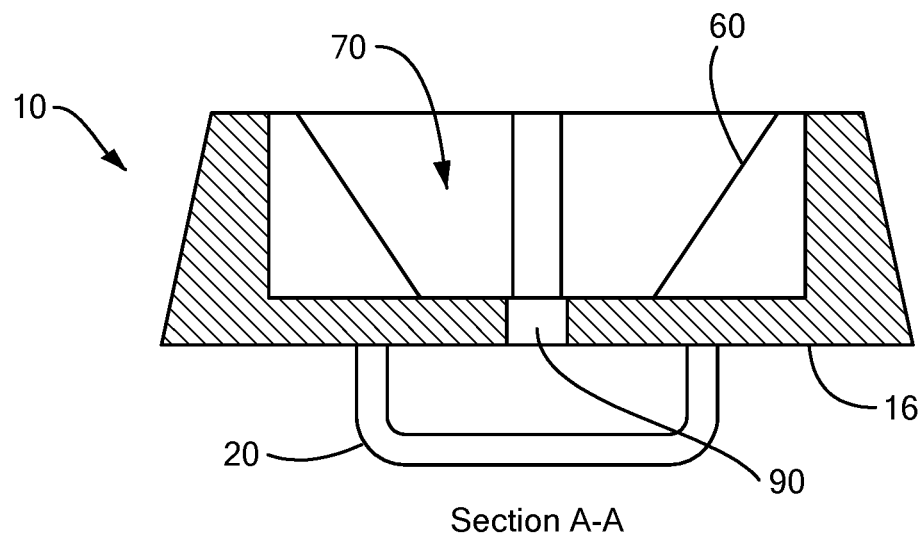
FIG. 1D is a schematic side view of section A-A of the device shown in FIG. 1B.
Figure 1E:
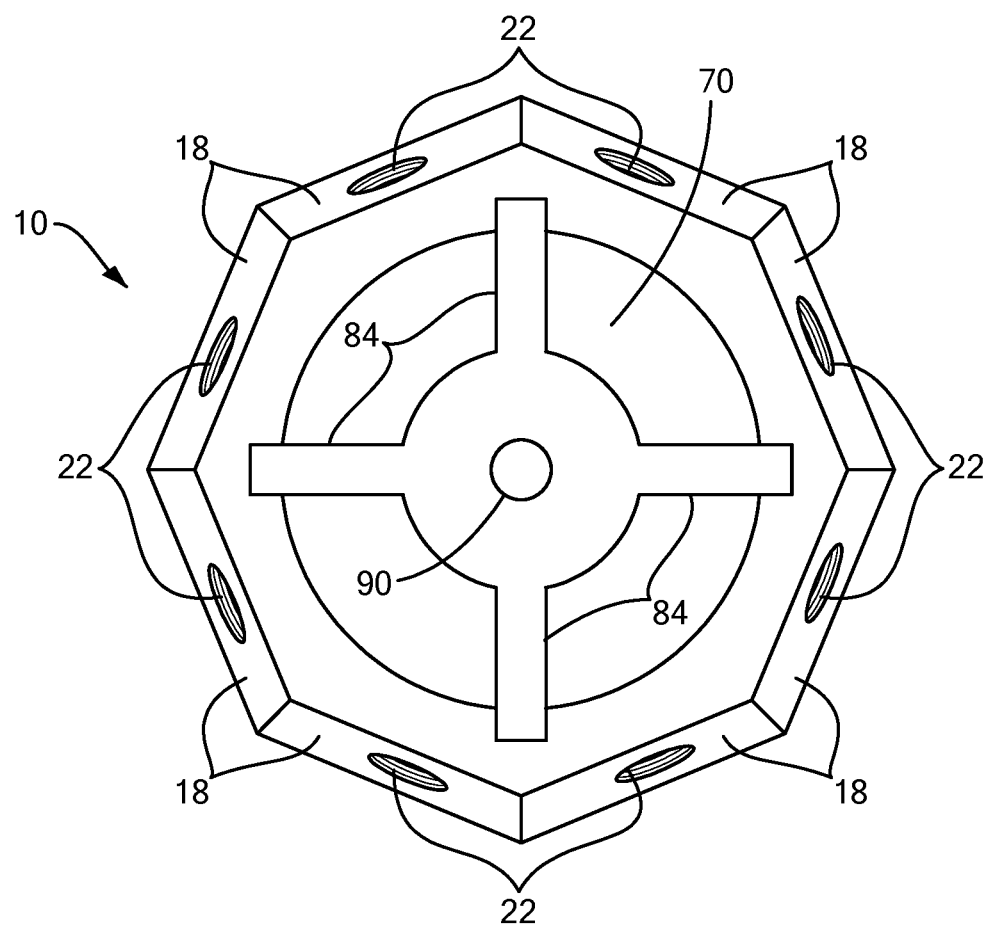
FIG. 1E is a schematic top view of the device shown in FIG. 1A.

Threaded opening 22, FIGS. 1A, 1B, and 1E is preferably female threaded as shown and the device that attaches to camouflage device 10 is preferably male threaded.

Figure 3:
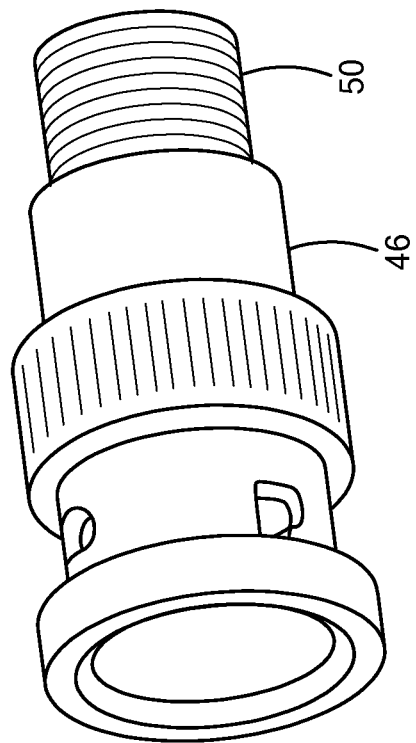
FIG. 3 is a three-dimensional front view showing one example of quick-lock fastening device which may be attached to the camouflage device shown in one or more of FIGS. 1A-2C.
Figure 3:
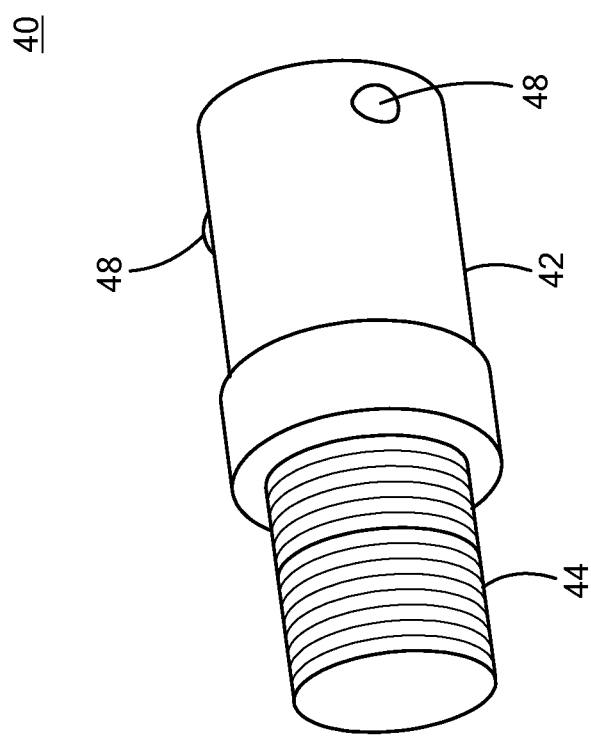
Figure 4:
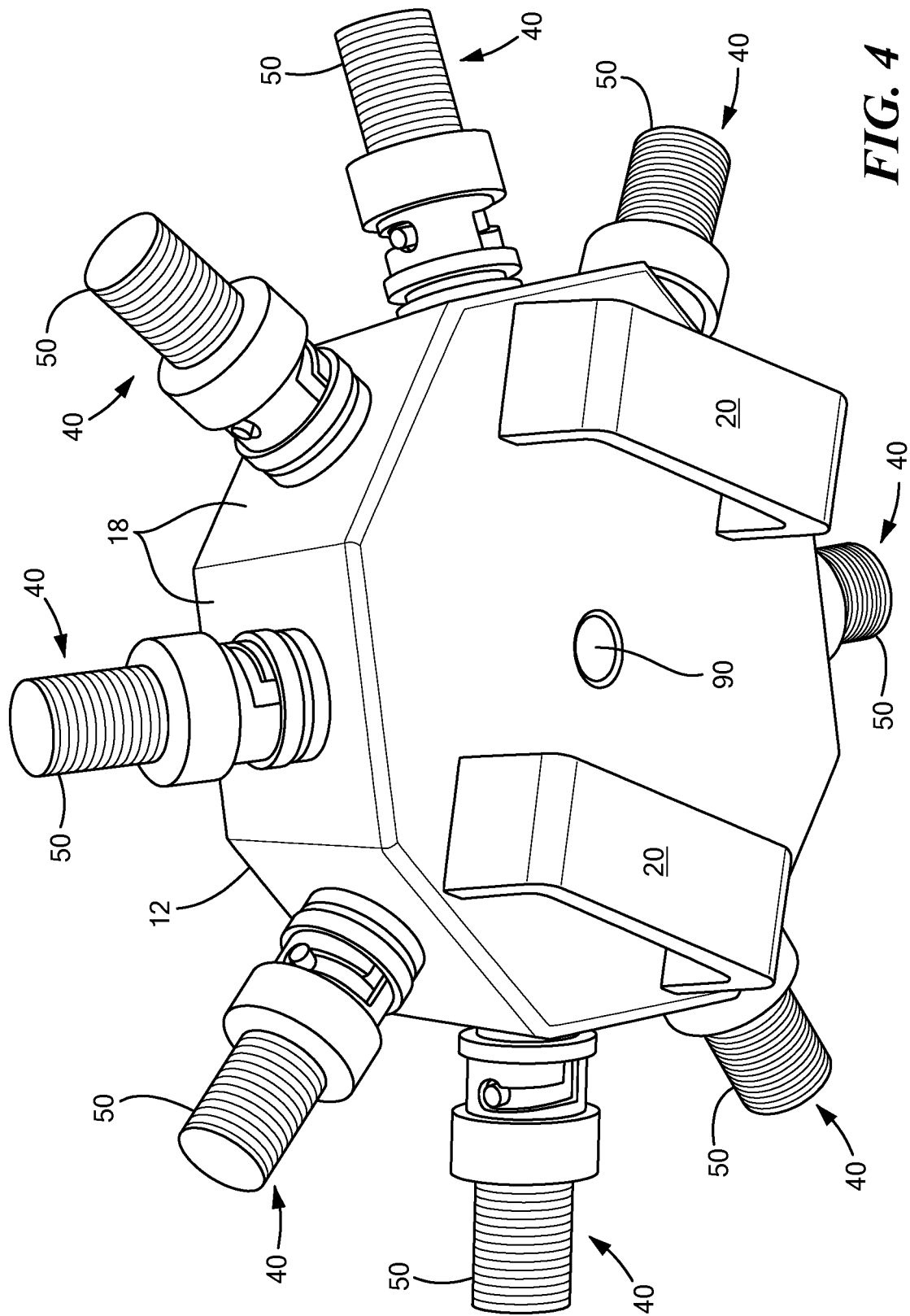
FIG. 4 is a three-dimensional bottom side view of the multifunctional, versatile, camouflage device shown in one or more of FIGS. 1A-5 including a plurality of quick-lock devices coupled thereto.
Figure 5:
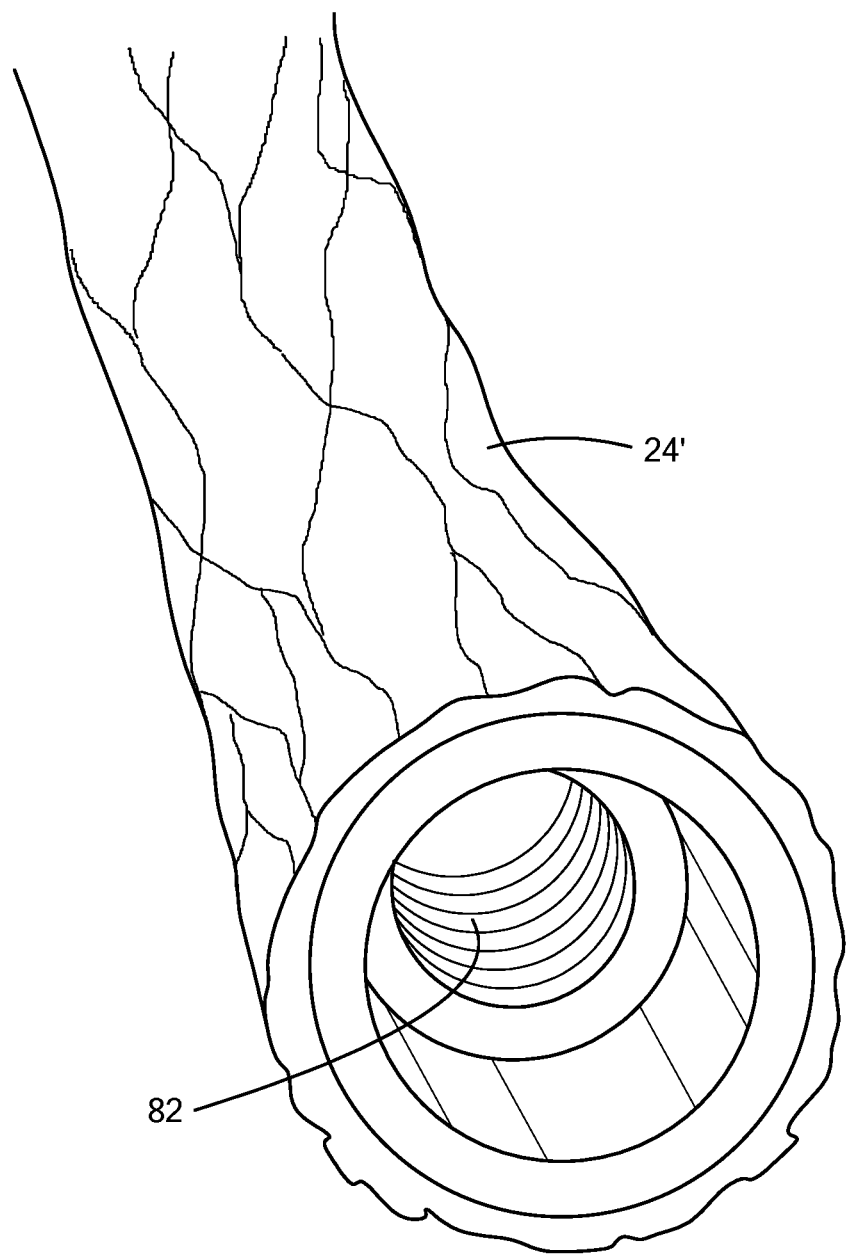
FIG. 5 is a three-dimensional view of one example of a camouflage branch including female threads which mate with male threads of the quick-lock device shown in FIGS. 3 and 4.

Camouflage device 10 may include at least one quick-lock device 40, FIG. 3, which preferably includes male connector 42 with male threaded portion 44. Male threaded portion 44 preferably threads into female thread opening 22, FIGS. 1A, 1B, and 1E, to secure male connector 42 to puck 12. Quick-lock device 40, FIG. 3, also preferably includes female connector 46 which couples to prongs 48 on male connector 42 thereby securing female connector 46 to male connector 42 and puck 12, e.g., as shown in FIG. 4. In one design, female connector 46, FIG. 3, may include male threaded portion 50. Male threaded portion 50 of quick-lock device 40 may be used to secure an artificial branch, e.g., artificial branch 24', FIG. 5, thereto with female threads 82, or any type of device that includes female threads that can mate with male threads 50.

Figure 6:
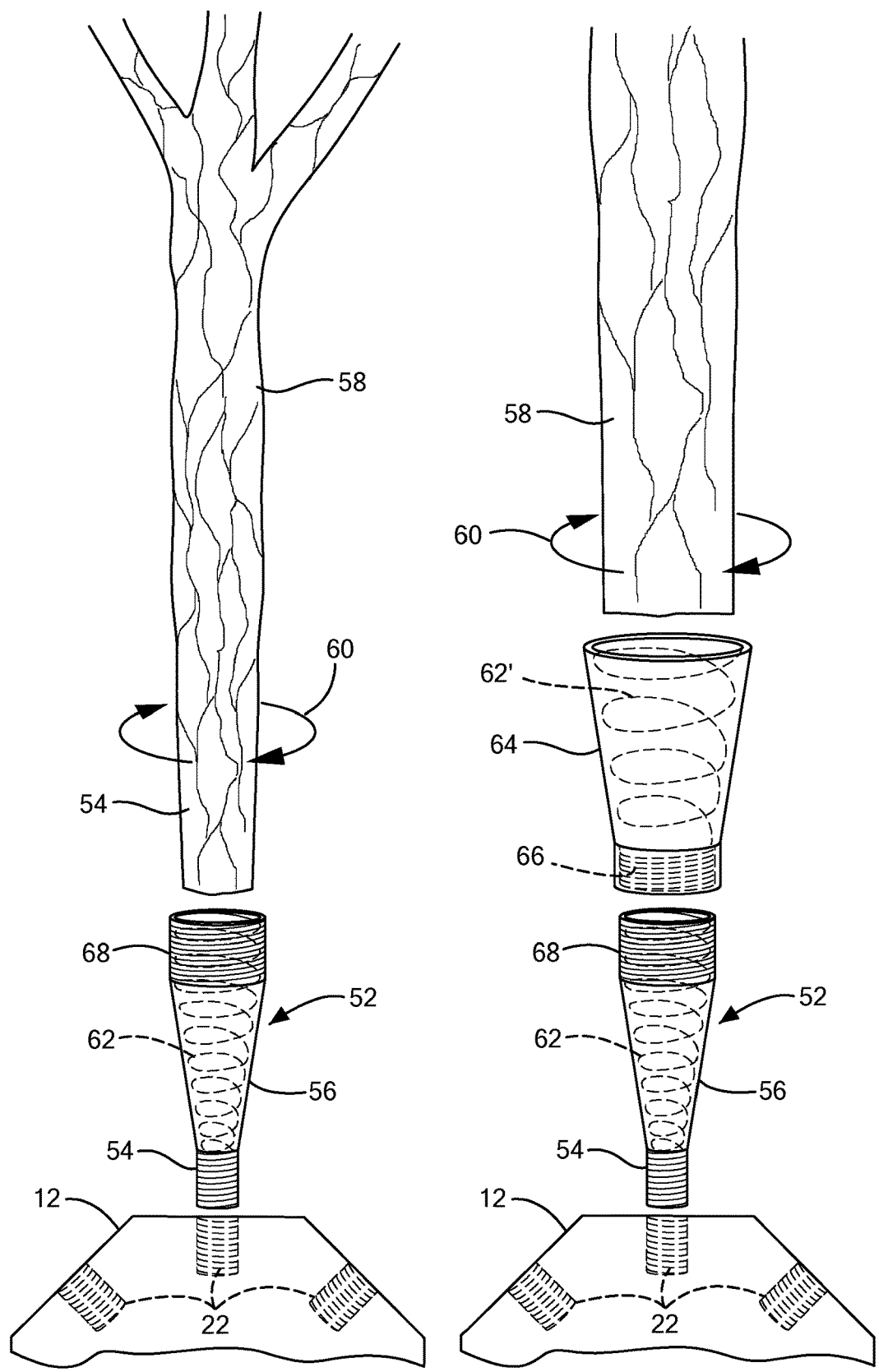
FIG. 6 depicts three-dimensional front views of an attachment device for securing real branches to the camouflage device shown in one or more of FIGS. 1A-4.

In one example, camouflage device 10 may include attachment device 52, FIG. 6, for attaching real camouflage branches to puck 12. In this example, attachment device 52 includes threaded portion 54 on one end which threads into threaded female opening 22 in puck 12. Attachment device 52 preferably includes cone shaped housing 56 configured to secure real camouflage branch 58 thereto, e.g., by twisting real camouflage branch 58 in the direction of arrows 60. In one example, cone shaped housing 56 may include sharp protruding threads 62 which preferably secure real camouflage branch 58 to cone shaped housing 56. In one design, attachment device 52 may include extender 64 configured to accommodate for larger real branches 58. Extender 64 preferably includes female threads 66 which thread onto male threads 68 to secure extender 64 to cone shaped housing 56. Extender 66 preferably includes sharp protruding threads 62' which preferably secure real camouflage branch 58 thereto.

In one design, puck 12, FIGS. 1A-1E, preferably includes shaped cutout 70 on top 14, e.g., as shown FIGS. 1A, 1D, and 1E. In one design, cutout 70 may be cone shaped as shown. In other examples, cutout 70 may have any desired shape known to those skilled in the art.

Camouflage device 10 preferably includes plug 72, FIGS. 7A-7E, which is preferably shaped to fit into shaped cutout 70. In one example, plug 72 is preferably cone shaped as shown to fit into cone shaped cutout 70 in puck 12. In other examples, plug 72 may have any desired shaped which fits into the shape of the cutout in puck 12.

Figure 7A:
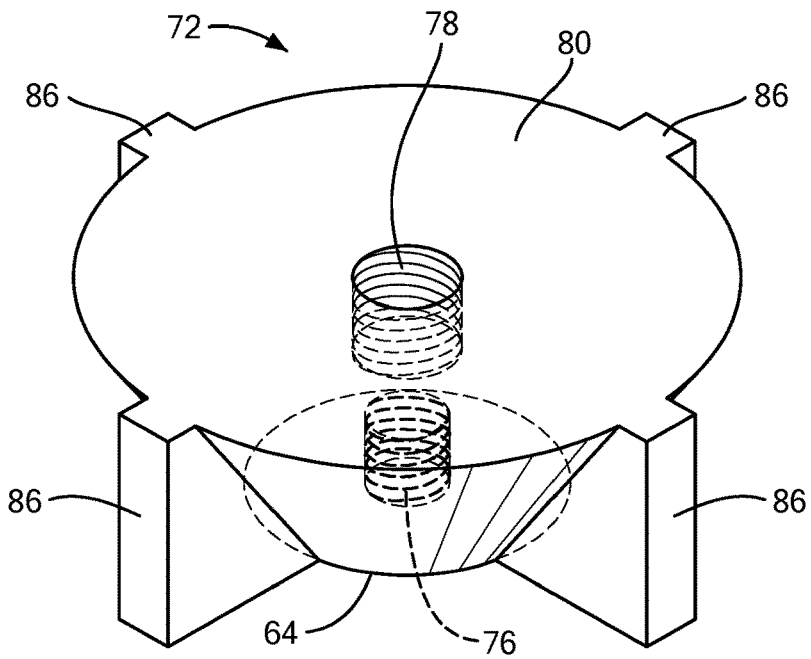
FIG. 7A is a three-dimensional view showing one example of a plug which may be utilized with the camouflage device shown in one or more of FIGS. 1A-6.
Figure 7B:
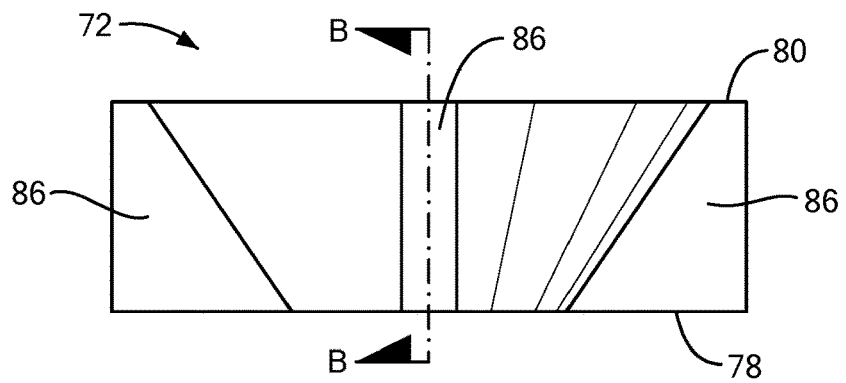
FIG. 7B is a schematic side view of the plug shown in FIG. 7A.
Figure 7C:
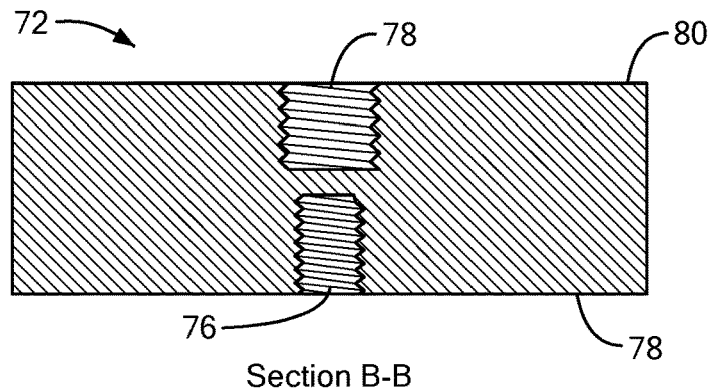
FIG. 7C is a schematic side view of section B-B of the device shown in FIG. 7B.
Figure 7D:
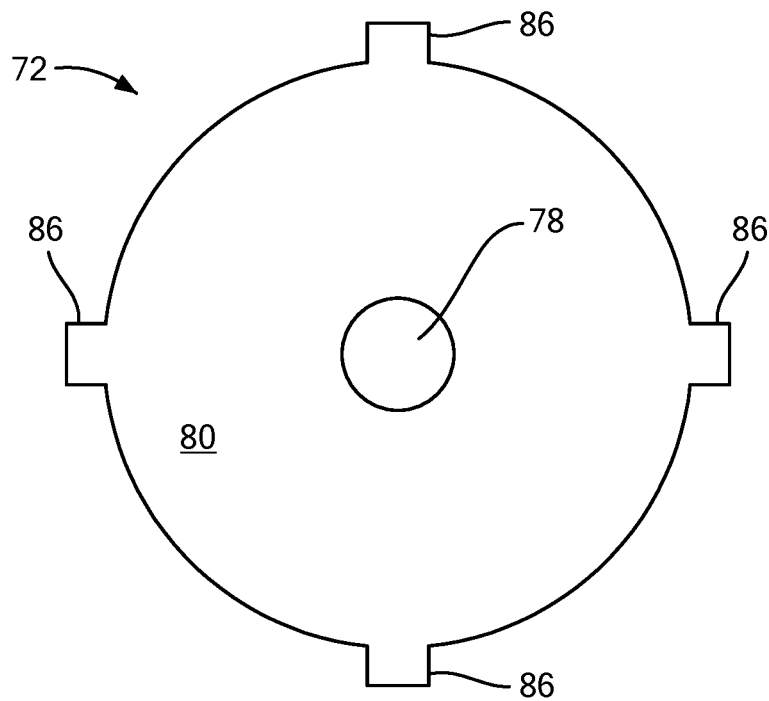
FIG. 7D is a bottom view of the device shown in FIG. 7A.
Figure 7E:
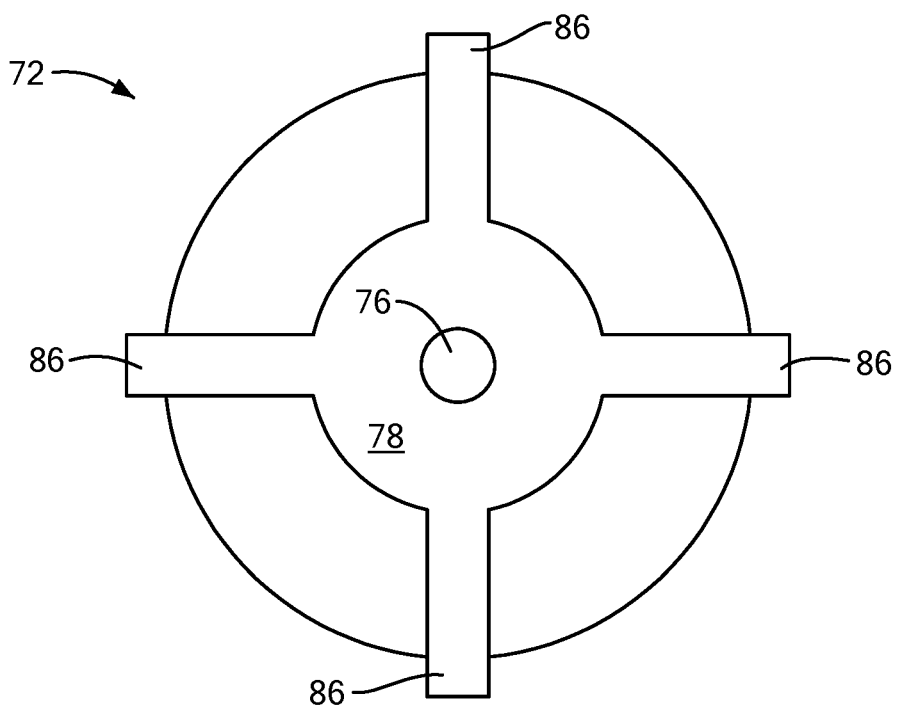
FIG. 7E is a schematic top view of the plug shown in FIG. 7A.
Figure 10:
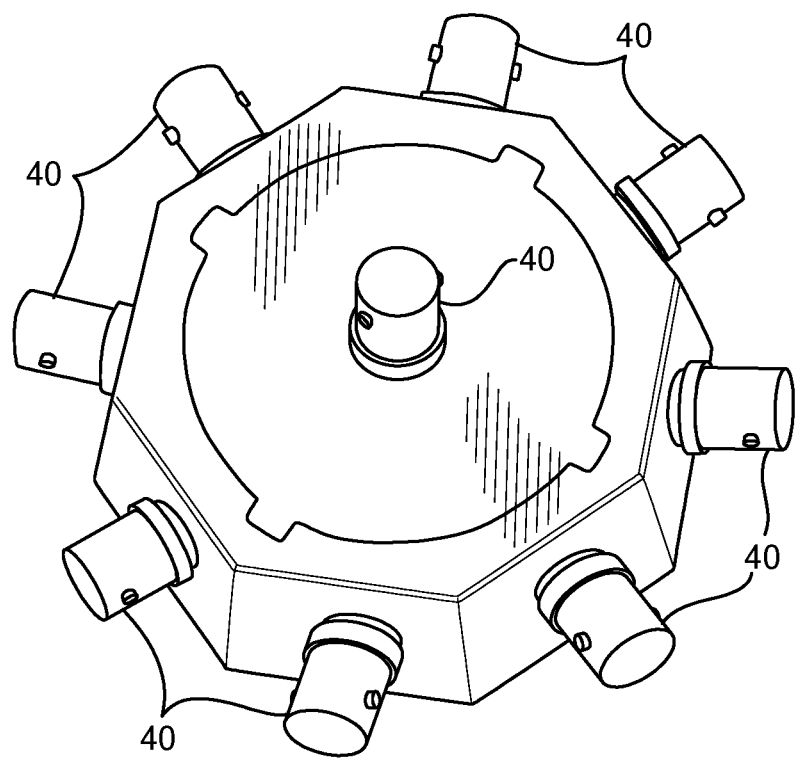
FIG. 10 is a three-dimensional view showing one example of the plug inserted into the cutout shown in FIG. 9 including a plurality of quick-lock devices attached to the puck.

Plug 72 preferably includes at least one threaded opening 76, FIGS. 7A, 7C and 7D on bottom 78 and at least one threaded opening 78, FIGS. 7A, 7C, and 7D on top 80. As discussed below, threaded opening 76 on the bottom of plug 72 may be used to secure puck 12 and plug 70 to any type of object having a threaded stud. Threaded opening 78 on the top of plug 72 may be utilized for attaching any type of device to plug 72, such as a camouflage branch 24, FIGS. 2A and 2B, the exemplary devices shown in FIG. 2B and FIG. 3, quick-lock device 40 shown in FIG. 10, or any other useful device known to those skilled in the art.

Figure 8:
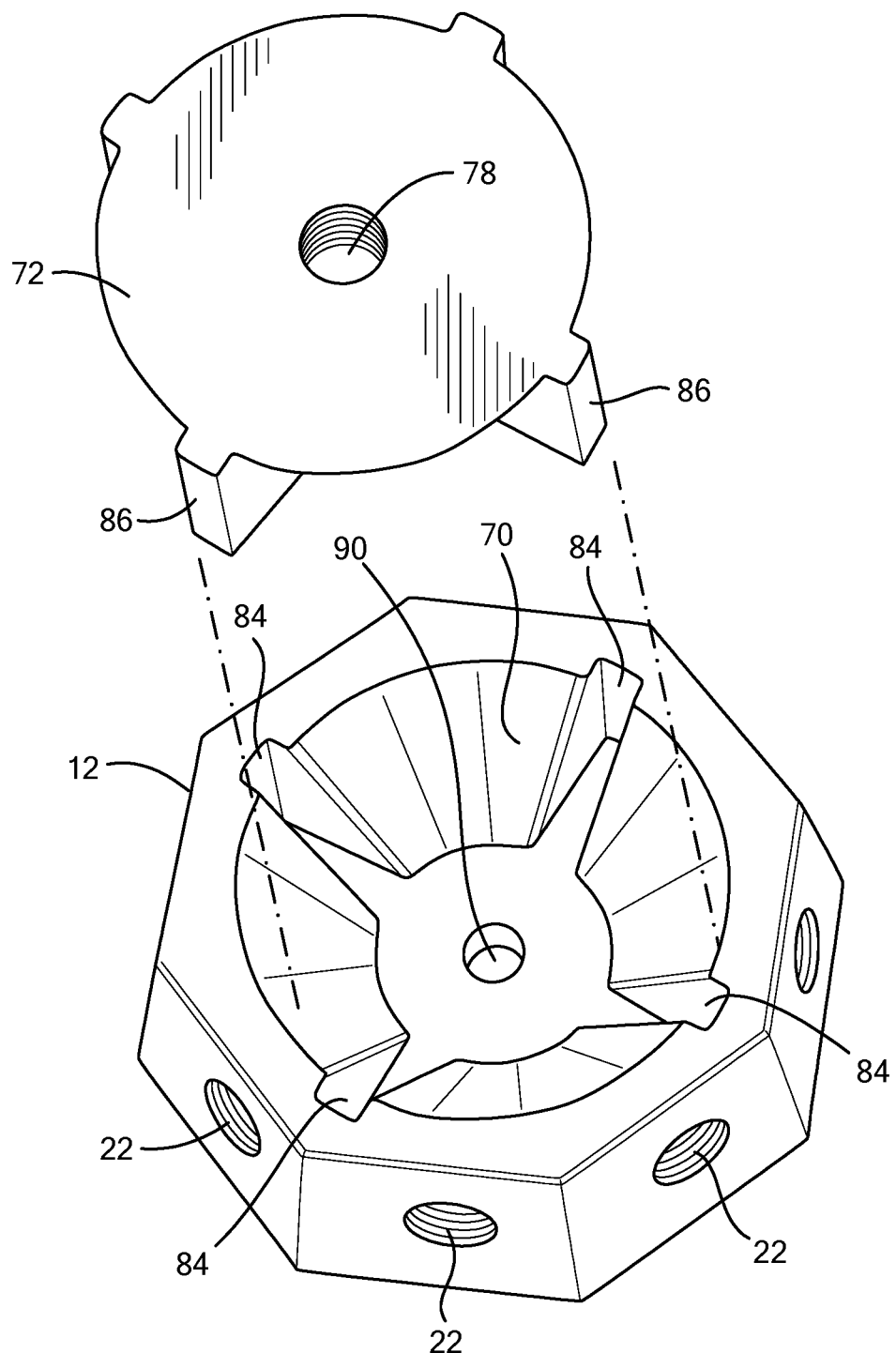
FIG. 8 is a three-dimensional front view showing an example of the plug shown in FIGS. 7A-7E aligned with the cutout of the puck of the camouflage device shown in one or more of FIGS. 1A-1E.
Figure 9:
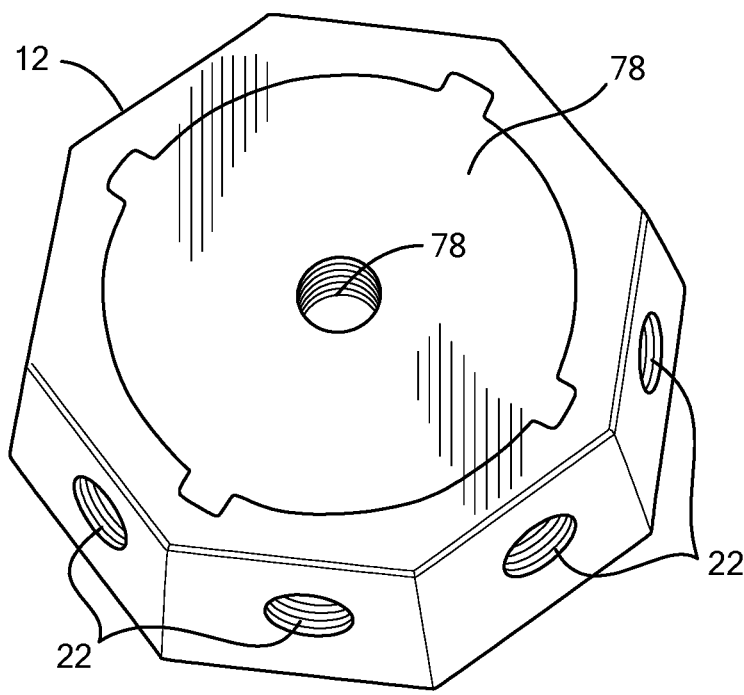
FIG. 9 is a three-dimensional view showing one example of the plug inserted into the cutout.

In one example, puck 12, FIGS. 1A-1E, preferably includes at least one slot, e.g., slots 84, FIGS. 1A and 1E, shown in further detail in FIG. 8. Plug 72, FIGS. 7A-7E preferably includes at least one fin, e.g., fins 86, FIGS. 7A, 7D, and 7E, which mate with slots 86, e.g., as shown in FIGS. 8 and 9.

In one example, puck 12 preferably includes opening 90, FIGS. 1A, 1C, 1E, and FIG. 8 in the center of puck 12 as shown.

Camouflage device 10 with puck 12 and plug 72 may be attached to an any object that includes a threaded stud. To do this, a threaded stud is extended through opening 90 in puck 12 and into threaded opening 76, FIGS. 7A, 7C and 7D on the of plug 70, as discussed below.

Figure 11A:
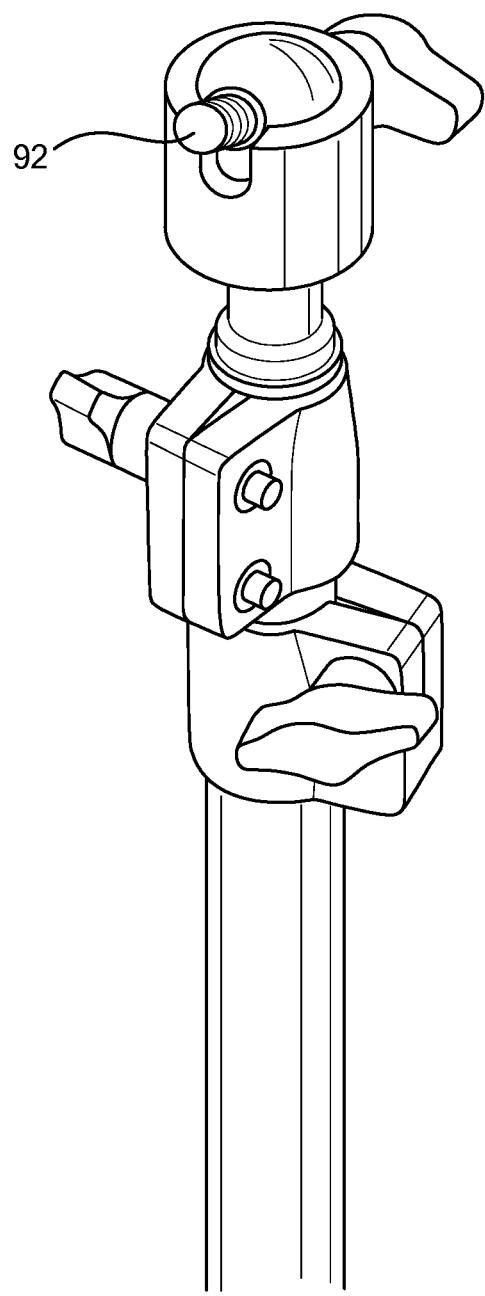
FIGS. 11A-11E show one example of securing the puck and plug to an object.
Figure 11B:
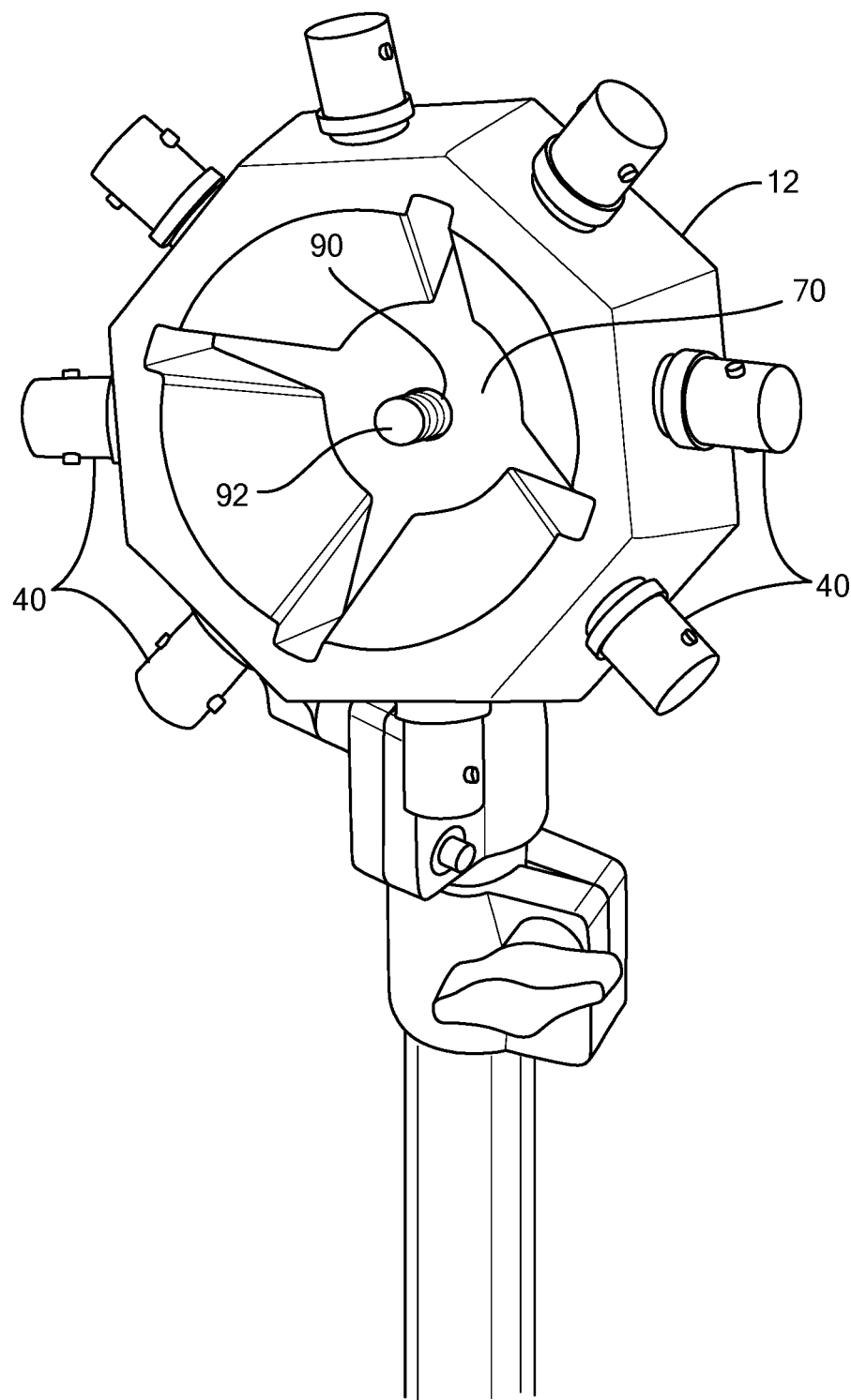
Figure 11C:
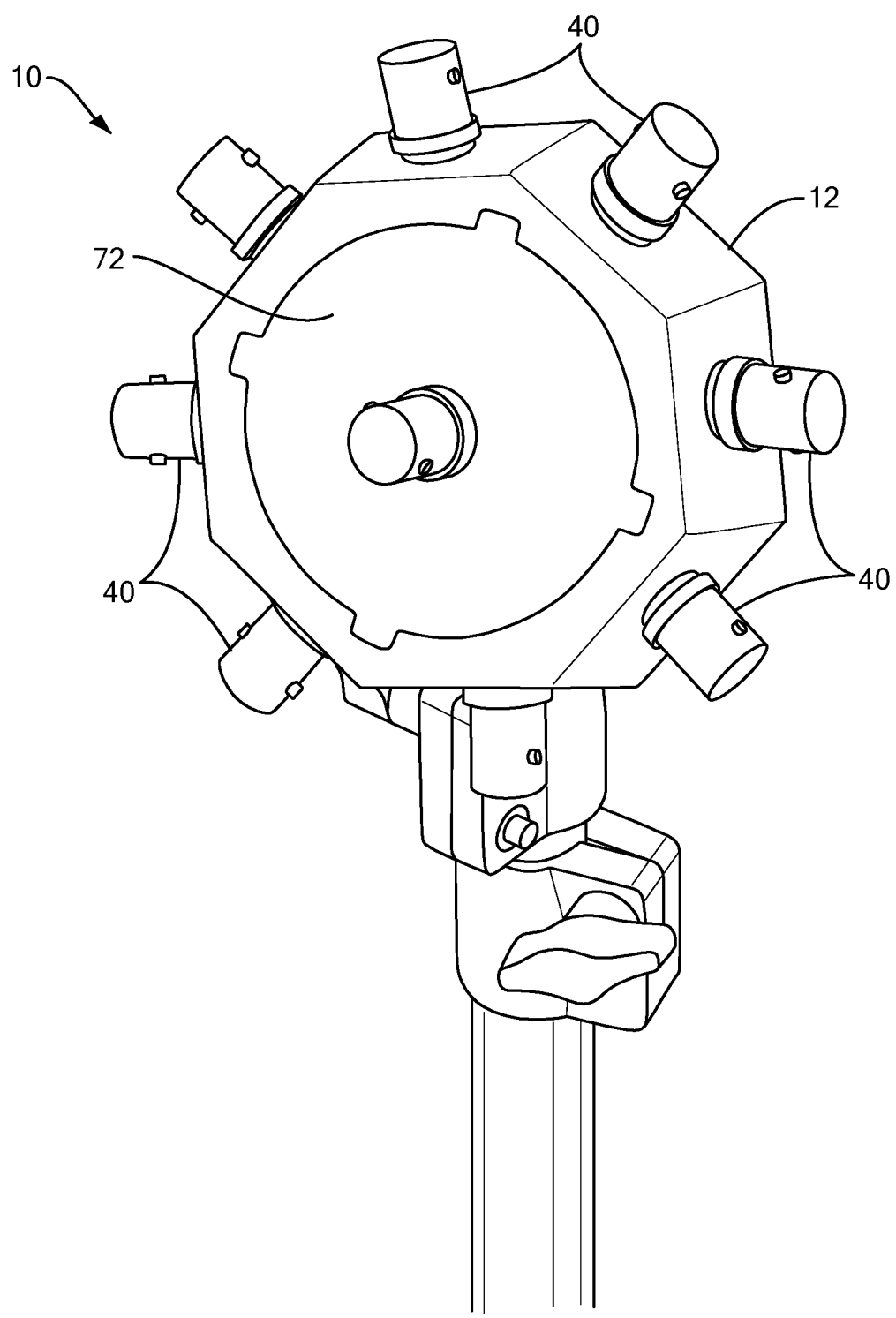
Figure 11E:
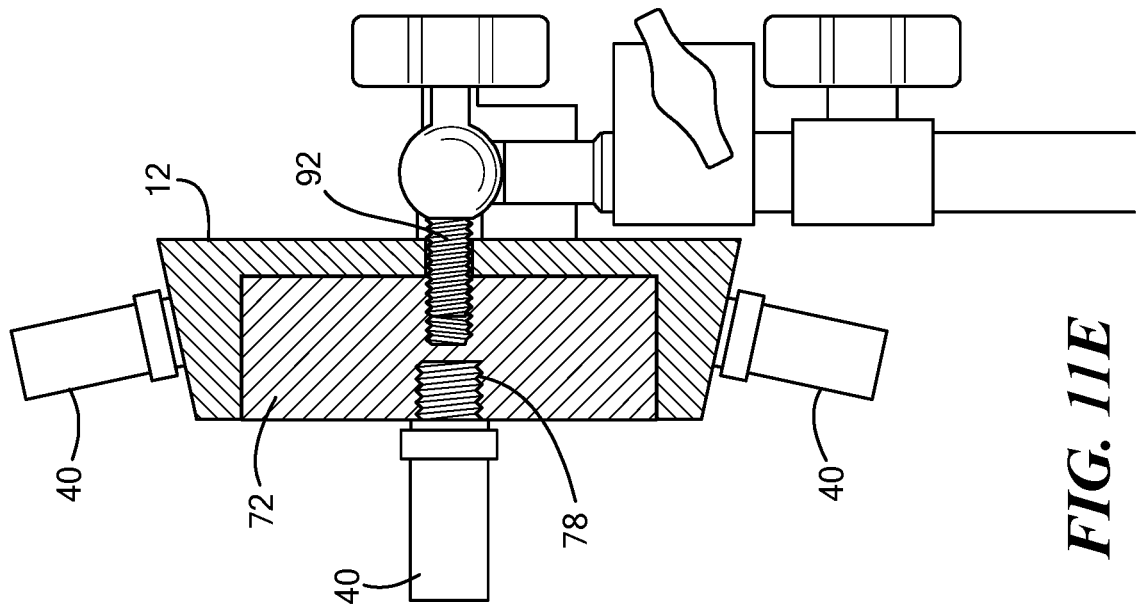
Figure 11D:
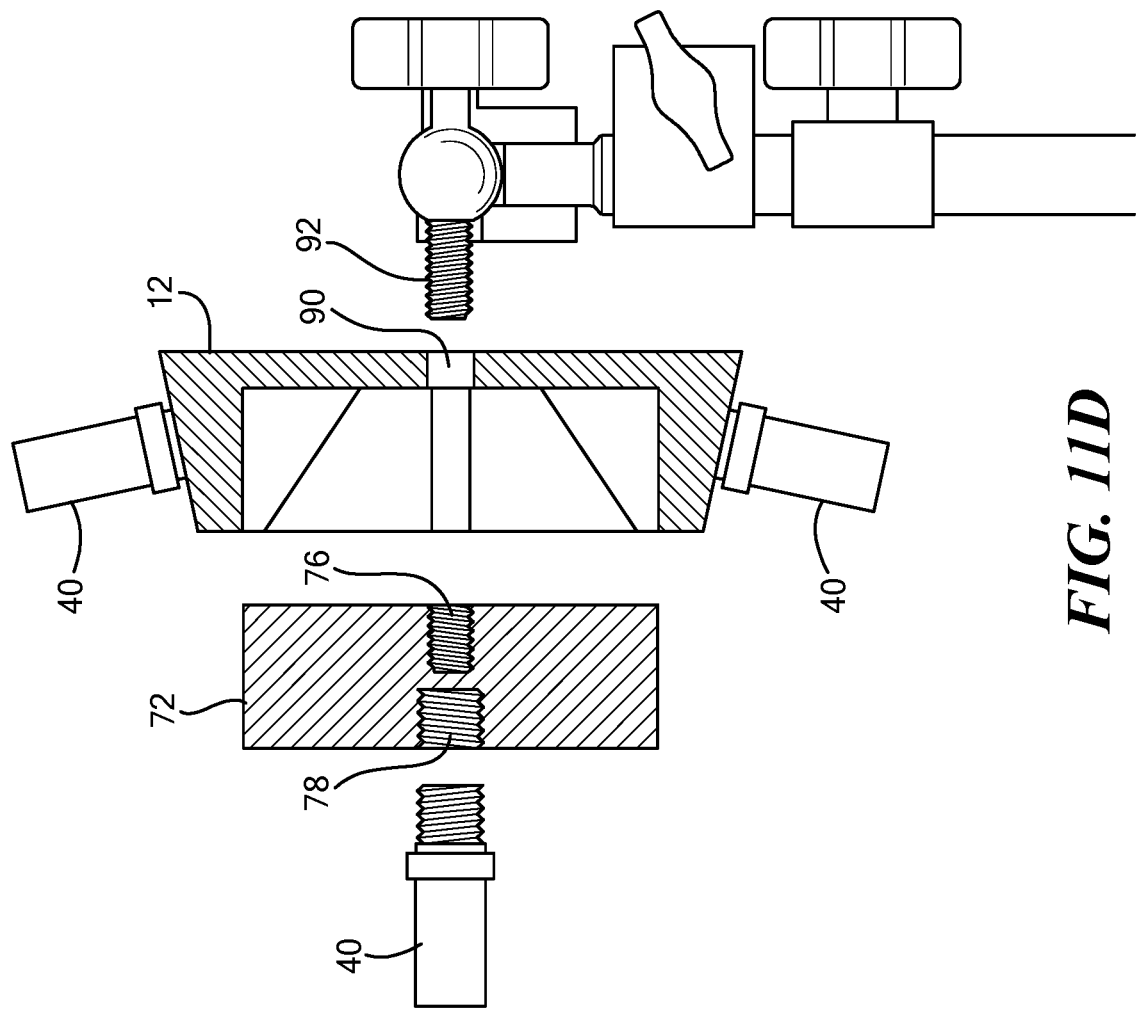

FIG. 11A shows one example of an object, in this example a pole of a tripod camera stand, that includes threaded stud 92. In one example, threaded stud 92 is disposed through opening 90, FIGS. 11B and 11D, in puck 12 as shown. Plug 72 is then placed into shaped cutout 70, e.g., as shown in FIGS. 8, 9, and 11E. Plug 72 is preferably secured to puck 12 via slots 84 and fins 86, as discussed above. Plug 72 and puck 12 are then secured to threaded stud 92 using threaded opening 76, FIGS. 7A, 7C and 7E on bottom 78 of plug 72. FIGS. 11C and 11E shows an example of puck 12 and plug 72 secured to an object, in this example a tri-pod camera stand. As discussed above, the object may be any object that includes a threaded stud.

In one example, the camouflage area discussed above may create a camouflage backdrop located behind the user which breaks-up the silhouette of the hunter.

The result is multifunctional, versatile, camouflage device 10 can be easily be set up and dismantled, can be easily be relocated from one position to another, can be attached to virtually any object including a tree, a stand, a vehicle, a pole, and may even be attached using magnets which have a threaded stud coupled thereto which an attach to any metal object, to create a camouflage area proximate a user. Camouflage device 10 can also use artificial branches, real branches, or a combination thereof.

Although as discussed above with reference to one or more of FIGS. 1A-11E, puck 12, plug 72, and quick-lock device 40 are utilized to create a camouflage area proximate a user, this is not a necessary limitation of this invention. In other examples, puck 12, plug 72, and quick-lock device 40 may be utilized to create a multifunctional, versatile device, attachable to any object as discussed above, that can attach any type of useful device thereto.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A device comprising:
    a puck including a top, a bottom, and a plurality of sides;
    a securing device on the bottom configured to secure the puck to an object;
    a threaded side opening in one of the plurality of sides having female threads;
    a quick-lock device coupled to the threaded side opening; and
    a camouflage device coupled to the puck via the quick-lock device to create a camouflage area proximate a user;
    wherein the quick-lock device includes a connector including a threaded portion on one end configured to thread into the threaded side opening and a male thread portion on an other end configured to secure the camouflage device.

2. The device of claim 1, wherein the camouflage device includes an artificial branch or a real camouflage branch.

3. The device of claim 1, wherein the securing device includes a bracket configured to receive a strap for securing the puck to the object.

4. The device of claim 1, wherein the plurality of sides of the puck are sloped.

5. The device of claim 1, wherein the puck is octagonal shaped.

6. The device of claim 1, wherein the top includes a shaped cutout.

7. The device of claim 6, further comprising a plug shaped to fit into the shaped cutout.

8. The device of claim 7, wherein the plug includes a threaded bottom opening on a bottom of the plug and a threaded top opening on a top of the plug.

9. The device of claim 8, wherein an additional camouflage device is coupled to the threaded top opening.

10. The device of claim 8, wherein the puck includes a central opening in a center of the puck.

11. The device of claim 10, wherein the puck and the plug are attached to the object with a threaded stud coupled to the object and extending though the central opening and into the threaded bottom opening.

12. The device of claim 7, wherein the shaped cutout includes at least one slot and the plug includes at least one fin.

13. The device of claim 12, wherein the at least one fin is configured to mate with the at least one slot.

14. The device of claim 1, wherein the camouflage area creates a camouflage backdrop located behind the user which breaks-up a silhouette of the user.

15. A device comprising:
a puck including a top, a bottom, and a plurality of sides;
a securing device on the bottom configured to secure the puck to an object;
a threaded side opening in one of the plurality of sides;
a shaped cutout in the top;
a plug shaped to fit into the shaped cutout and including one or more openings therein; and
a camouflage device coupled to the puck to create a camouflage area proximate a user.

16. The device of claim 15, wherein the camouflage device includes an artificial branch or a real camouflage branch.

17. The device of claim 15, wherein the securing device includes a bracket configured to receive a strap for securing the puck to the object.

18. The device of claim 15, wherein the threaded side opening is female threaded.

19. The device of claim 18, wherein the camouflage device is threaded to the threaded side opening to secure the camouflage device to the puck.

20. The device of claim 18, further comprising a quick-lock device coupled to the threaded side opening.

21. The device of claim 20, wherein the quick-lock device includes a connector including a threaded portion on one end configured to thread into the threaded side opening and a male thread portion on an other end configured to secure the camouflage device.

22. The device of claim 18, further comprising a real branch attachment device including a threaded portion on one end configured to thread into the threaded side opening and a cone shaped housing on an other end configured to secure a real camouflage branch.

23. The device of claim 22, wherein the cone shaped housing includes sharp protruding threads on an inside surface of the cone shaped housing configured to secure the real camouflage branch to the cone shaped housing.

24. The device of claim 15, wherein the plurality of sides are sloped.

25. The device of claim 15, wherein the puck is octagonal shaped.

26. The device of claim 15, wherein the plug includes a threaded bottom opening on a bottom of the plug and a threaded top opening on a top of the plug.

27. The device of claim 26, wherein an additional camouflage device is coupled to the threaded top opening.

28. The device of claim 26, wherein the puck includes a central opening in a center of the puck.

29. The device of claim 28, wherein the puck and the plug are attached to the object with a threaded stud coupled to the object and extending though the central opening and into the threaded bottom opening.

30. The device of claim 15, wherein the shaped cutout includes at least one slot and the plug includes at least one fin.

31. The device of claim 30, wherein the at least one fin is configured to mate with the at least one slot.

32. The device of claim 15, wherein the camouflage area creates a camouflage backdrop located behind the user which breaks-up a silhouette of the user.

33. A device comprising:
a puck including a top, a bottom, and a plurality of sides;
a securing device on the bottom configured to secure the puck to an object;
a threaded side opening in one of the plurality of sides having female threads; and
a camouflage device coupled to the puck to create a camouflage area proximate a user, the camouflage device including a real branch attachment device including a threaded portion on one end configured to thread into the threaded side opening and a cone shaped housing on an other end configured to secure a real camouflage branch, the cone shaped housing including sharp protruding threads on an inside surface of the cone shaped housing configured to secure the real camouflage branch to the cone shaped housing.

* * * * *